(12) United States Patent
Vo

(10) Patent No.: US 8,534,516 B1
(45) Date of Patent: Sep. 17, 2013

(54) PROTECTIVE ROOF RACK SYSTEM

(76) Inventor: Tri D. Vo, San Diego, CA (US)

( * ) Notice: Subject to any disclaimer, the term of this patent is extended or adjusted under 35 U.S.C. 154(b) by 345 days.

(21) Appl. No.: 12/948,441

(22) Filed: Nov. 17, 2010

(51) Int. Cl.
*B60R 9/12* (2006.01)

(52) U.S. Cl.
USPC .............................. 224/318; 224/324; 224/329

(58) Field of Classification Search
USPC .............. 224/309, 318, 324, 329–331, 917.5; 40/591–593
See application file for complete search history.

(56) References Cited

U.S. PATENT DOCUMENTS

| | | | |
|---|---|---|---|
| 2,196,341 A | | 4/1940 | Rush |
| 3,000,419 A | | 9/1961 | Morrison |
| 4,101,062 A | | 7/1978 | Lazar |
| 4,226,354 A | * | 10/1980 | Allen .............................. 224/318 |
| 4,247,026 A | | 1/1981 | Heifner et al. |
| 4,253,595 A | | 3/1981 | Tiffany |
| 4,433,804 A | | 2/1984 | Bott |
| 5,096,107 A | | 3/1992 | VanSon |
| 5,285,936 A | | 2/1994 | Matricardi, Jr |
| 5,423,588 A | | 6/1995 | Eglinton |
| 5,607,093 A | * | 3/1997 | Geier ............................ 224/318 |
| 5,713,498 A | | 2/1998 | Cucci |
| 5,769,291 A | * | 6/1998 | Chasan ........................ 224/324 |
| D410,224 S | | 5/1999 | Landy |
| 5,947,354 A | | 9/1999 | Williams |
| 6,234,371 B1 | | 5/2001 | Sinn |
| 6,257,470 B1 | | 7/2001 | Schaefer |
| 6,772,926 B2 | | 8/2004 | Eichele et al. |
| 6,845,895 B2 | | 1/2005 | Jones et al. |

* cited by examiner

*Primary Examiner* — Adam Waggenspack
(74) *Attorney, Agent, or Firm* — Montgomery Patent & Design; Robert C. Montgomery

(57) ABSTRACT

The present invention includes a polyurethane foam block placed on a vehicle rooftop to protect the vehicle's rooftop from damage during transport of cargo supported thereon, further comprising a generally trapezoidal shape of a length substantially equal than a width of the vehicle, further having a pair of opposing flexible extending ear portions. The bottom surface comprises a corrugated base of foam material to conform to the curvature of the vehicle's rooftop. An elastic fabric covers the device and the ear portions and further comprises a means for receiving rigging material in securing the device to the existing vehicle rooftop and preventing unwanted cargo shifting.

13 Claims, 5 Drawing Sheets

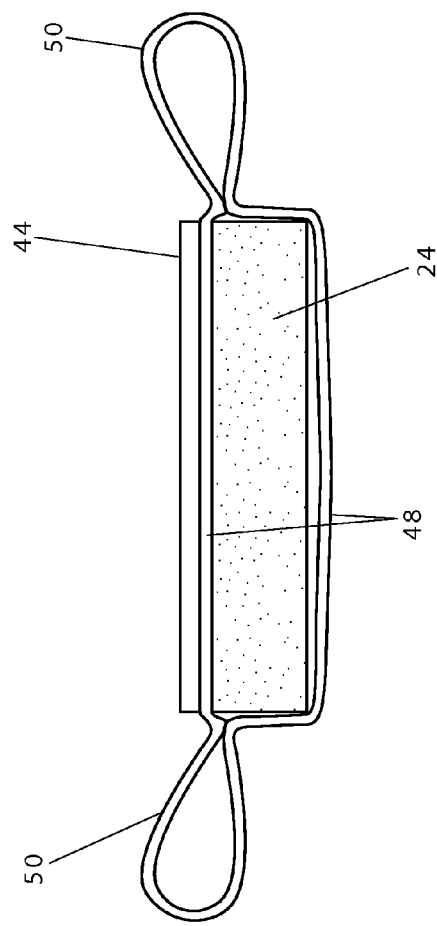
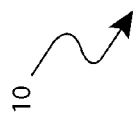
Fig. 5

PROTECTIVE ROOF RACK SYSTEM

RELATED APPLICATIONS

The present invention was first described in and claims the benefit of U.S. Provisional Application No. 60/816,076, filed Jun. 26, 2006, and U.S. patent application Ser. No. 11/821,661, filed on Jun. 25, 2007, the entire disclosures of which are incorporated herein by reference.

FIELD OF THE INVENTION

The present invention relates generally to a novel system to prevent cargo on automobile roof racks from shifting during transport and, more particularly, to the system providing a means for a foam block being covered with a fabric envelope removably attachable to a conventional vehicle rooftop to protect cargo and to protect the vehicle's roof.

BACKGROUND OF THE INVENTION

Pickup trucks, trailers and other moving aids are often called upon for service when moving large, heavy objects. However, there are many times when large and bulky, but relatively lightweight, objects such as tables, chairs, lumber, boxes and even Christmas trees require transportation. Since such objects will not fit inside a typical motor vehicle, many people resort to transporting these items on the roofs of their cars. Since most cars do not come equipped with luggage racks, people may place towels, carpeting, cardboard or other materials to protect the finish of the vehicle roof. It is often observed that such materials slide about when the object is being loaded, which may allow the roof to buckle at the high point in the case of curved roofs and present a danger should the object and protector slide about during transport.

Several attempts have been made in the past to design an apparatus to prevent cargo on automobile roof racks from shifting during transport. U.S. Pat. No. 5,769,291 in the name of Chasan discloses a support pad assembly for carrying articles on a vehicle roof with first and second elongate members each having an upper pad member of cushioning material. A first side bolster is hinged to one side edge of the upper member and a second side bolster is hinged to the opposite side edge of the upper member. Each side bolster has a core of cushioning material and extends along the entire length of the elongate member. The side bolsters are of a rectangular cross-section and have opposing inner faces carrying inter-engageable fasteners for releasably securing the side bolsters together beneath the upper pad member. The two (2) elongate members are secured on spaced crossbars of a vehicle roof rack by placing the upper pad member on top of a roof rack crossbar and engaging the side bolsters beneath the crossbar. At least one (1) tie down strap is secured to one (1) end of each elongate member for securing an elongate item on top of the upper pad member. Unfortunately, this prior art example is not designed to be easily installed or removed from a vehicle.

U.S. Pat. No. 5,607,093 in the name of Geier discloses a carrier device for supporting and securing different objects to a luggage rack of a vehicle or directly to the roof of a vehicle which does not have a luggage rack. The device includes a carrier fabric on which one (1) side is covered along its length with loops and one half (½) with barbs. The fabric is formed with cushioned straps on one half opposite either the hooks or barbs. The fabric may be placed onto a luggage rack bar across the width of a vehicle, and skis, fishing poles or the like can be secured by the straps to the support carrier. Alternatively, the carrier device may be secured directly to a vehicle roof which does not have a luggage rack. To this end, the carrier device is wrapped around a filler member and end straps with hooks thereon are provided and designed to connect to a vehicle gutter or other part of the vehicle body such as the lip of the roof. Unfortunately, this prior art example is not designed to be compatible with vehicles with a preexisting luggage rack.

U.S. Pat. No. 5,377,889 in the name of Sumino describes an automobile roof carrier mainly composed of a magnetic base portion, a gripping portion for removal, a covering member and a loading article holding portion. The covering member is integrally jointed over the magnetic base portion while the magnetic base portion is covered by the covering member except in the attractive surface of the magnetic base portion and the gripping portion for removal. Combined integrally in the upper part of the covering member is a loading article holding portion which is able to be opened and closed. A supplementary cover which is able to be opened and closed is attached to the covering member so that the gripping portion for removal may be hidden and exposed. There is provided a first locking mechanism for maintaining the closed state of the supplementary cover, whereas there is provided a second locking mechanism for maintaining the closed state of the loading article holding portion. A common key for releasing the locked states of these locking mechanisms is provided. The automobile roof carrier of the invention further includes means for preventing the degradation of appearance, increment of air flow resistance at driving, and the reduction of contacting area with the roof and the like. Unfortunately, this prior art example provides for a permanent fixture to an automobile roof, and is therefore not designed to be easily installed and removed.

None of the prior art particularly describes a novel system to prevent cargo on automobile roof racks from shifting during transport and, more particularly, to the system providing a means for a foam block being covered with a fabric envelope removably attachable to a conventional vehicle rooftop to protect cargo and to protect the vehicle's roof. Accordingly, there is a need for a means by which large, bulky, but lightweight objects can be safely transported on the roof of a motor vehicle without damaging the roof or causing other problems as listed above. The present invention is simple to use, inexpensive, and designed for many years of repeated use.

SUMMARY OF THE INVENTION

In view of the foregoing disadvantages inherent in the prior art, it has been observed that there is need for a novel system to prevent cargo on automobile roof racks from shifting during transport comprised of a trapezoidal foam block covered with a fabric envelope and removably attachable to the vehicle rooftop.

The invention as presently conceived is a foam block attachable to conventional vehicle rooftop carriage racks to protect cargo and the vehicle's roof from damage during transport. The device comprises a foam block that is generally trapezoidal in shape and which is sufficiently flexible to conform to the curvature of the vehicle's roof. The system is envisioned to be introduced in a pair of units. A tube provides form-fitting covering of the foam padding. The system further comprises a plurality of extensions integrally sewn to opposing end portions of the tube along a top outer edge to allow for secure fastening of the system to a vehicle. Each extension comprises a fastening loop portion which allows a user to route a rigging member such as a ratcheting tie-down, a rope, a cord, or the like through the loop portion to secure the system.

The block further comprises an integral first ear portion at a proximal end and an integral second ear portion at a distal end. The first ear portion and the second ear portion are constructed of a similar material to the block and extend outwardly from and coplanar with a bottom surface of the block. The first ear portion and the second ear portion provide a protective padding to window openings of the vehicle during use of the system. The first ear portion and the second ear portion further provide attachment to the fabric envelope.

The fabric envelope is removably attachable to the block to facilitate cleaning, servicing, and replacement. The fabric envelope is envisioned to be introduced in a variety of decorative colors and patterns and may contain various indicia such as logos, messages, script, or the like.

The method of installing and utilizing the system may be achieved by procuring an instance of the system having a desired length, color, and indicia; inserting the foam block into the fabric envelope, if not previously installed; inserting the ear portions of the block through respective anchoring loop portions of the extensions; opening door or window portions of the vehicle; positioning the system on a rooftop portion of the vehicle at a desired location; positioning the extensions so as to be suspended on each side downwardly over a window opening; securing the system to the vehicle by routing at least one (1) rigging member through the fastening loop portions of the first extension; routing the rigging member through the fastening loop portions of the second extension; routing the rigging member across an interior ceiling portion of the vehicle; latching and tightening the rigging member if utilizing a tie-down device or tying the rigging member if utilizing rope, cord, or the like to secure the system; installing a second rigging member as previously described by utilizing the remaining fastening loops as needed; installing additional units of the system along a roof portion of the vehicle as described above as needed based upon an anticipated cargo to be loaded; placing a quantity of cargo or other similar items to be transported upon the system; securing the cargo by using additional rigging members as required to stabilize the cargo; transporting the cargo to a destination in a normal manner; removing the rigging members and removing the cargo from the system; removing the rigging members; removing and storing the system until again needed; and, benefiting from a protective, safe, and easily installed system for transporting cargo using a vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
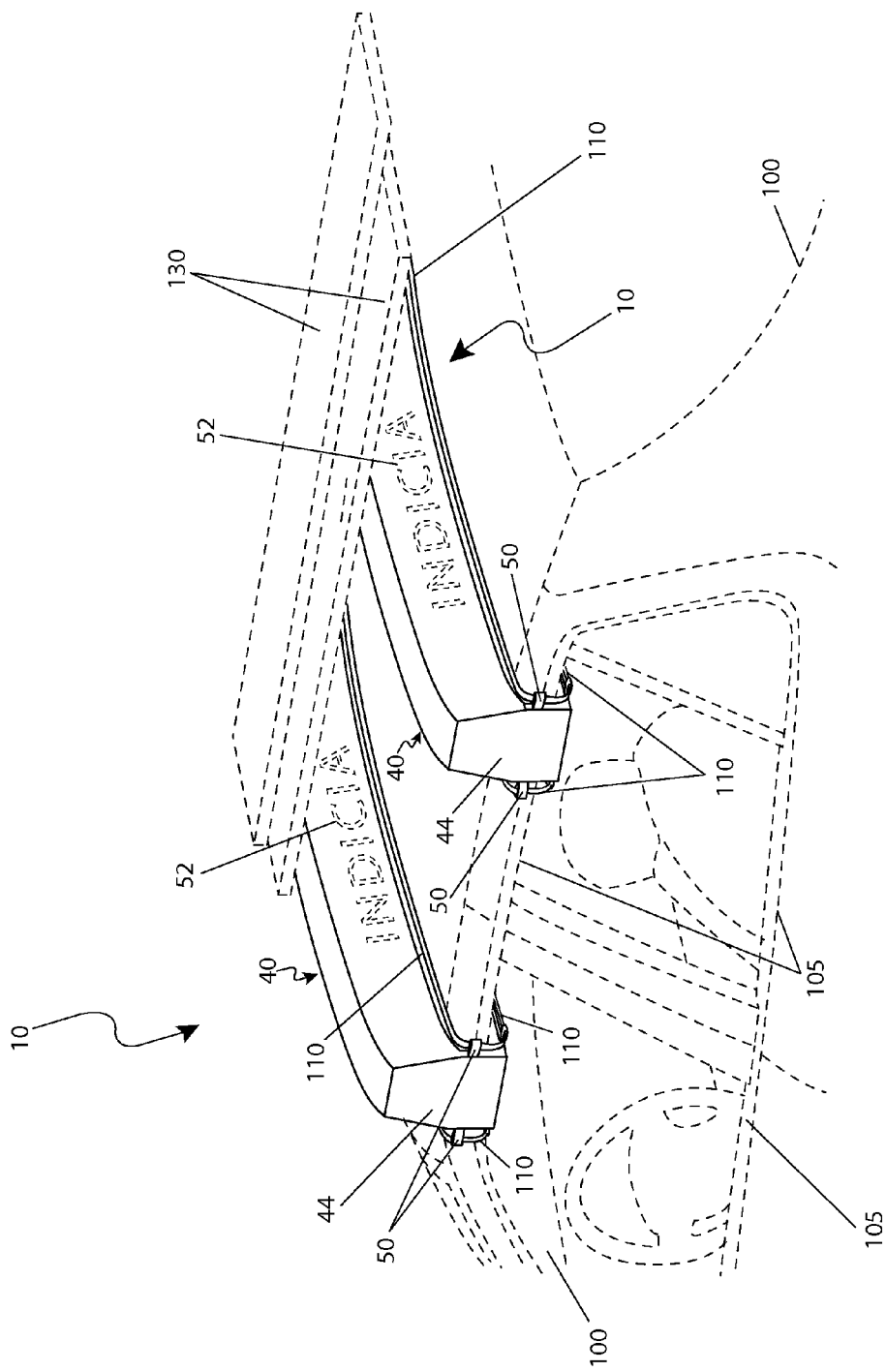
FIG. 1 is an environmental view of a protective rooftop rack system for motor vehicles 10, according to a preferred embodiment of the present invention.

| DESCRIPTIVE KEY | |
| --- | --- |
| 10 | protective rooftop rack system for motor vehicles |
| 20 | foam assembly |
| 22 | block |
| 24 | first ear |
| 25 | second ear |
| 40 | fabric envelop assembly |
| 42 | tube |
| 44 | first fabric extension |
| 46 | second fabric extension |
| 48 | anchoring loop |
| 50 | fastening loop |
| 52 | indicia |
| 100 | vehicle |
| 105 | window opening |
| 110 | rigging member |
| 130 | cargo |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a protective rooftop rack system for motor vehicles (herein described as the "system") 10, which provides a means for a polyurethane foam block 20 being covered with a fabric envelope assembly 40 and removably attachable to a conventional vehicle rooftop 100 to protect cargo 130 and the roof portion of a vehicle 100 from damage during transport. The system 10 is envisioned to be introduced as a pair of units of the system 10 comprising identical units being trapezoidal in cross-section and being equipped with fabric envelope assemblies 40 for ease in cleaning. The trapezoidal shape of the system 10 provides improved compressive properties as well as additional stability while supporting cargo 130. A user may use common ratcheting tie-downs 110 or equivalent means to assist in securing the system 10 to an existing vehicle rooftop 100.

Referring now to FIG. 1, an environmental view of the system 10 depicting an in-use state, according to the preferred embodiment of the present invention, is disclosed. The system 10 comprises a foam assembly 20 and a fabric envelope assembly 40. The system 10 is envisioned to be introduced in a pair of units; however, it is understood that a singular unit of the system 10 may be procured and utilized effectively, if desired, and as such should not be interpreted as a limiting factor of the system 10. The fabric envelope assembly 40 comprises a fabric tube 42, a first extension 44, and second extension 46. The tube 42 provides a form-fitting covering of the foam block 22. The extensions 44, 46 are integrally sewn to opposing end portions of the tube 42 along a top outer edge, thereby allowing secure fastening of the system 10 to the vehicle 100 via a plurality of rigging members 110 being routed through fastening loop portions 50 of said extensions 44, 46. Said rigging members 110 comprise common devices such as ratcheting tie-downs 110, rope, cord, or the like, thereby preventing unwanted shifting of anticipated cargo 130.

The system 10 is illustrated here being applied to a sedan type vehicle 100; however, the invention 10 is not limited to the illustrated application, and a person skilled in the art will appreciate that other applications of the system 10 to vehicles 100 such as sport utility vehicles, pick-up trucks, or the like are possible without deviating from the basic concept and as such should not be interpreted as a limiting factor of the present invention 10. The system 10 is shown here being typically arranged on a vehicle rooftop 100 such that the length of the system 10 is arranged perpendicular to the length of said vehicle 100. The system 10 is illustrated here showing two (2) apparatuses arranged in the front and back of said vehicle 100 in a parallel manner; however, any practical number of apparatuses may be used simultaneously based upon cargo 130 quantities or user preferences.

Each extension 44, 46 comprises four (4) perpendicularly protruding fastening loops 50 which provide a means to rout and secure the system 10 to the roof portion of the vehicle 100 using at least one (1) common rigging member 110 such as a ratcheting tie-down, which is passed through said fastening loops 50 and wrapped around the roof portion of the vehicle 100. In use, said rigging member 110 is routed through the fastening loop portions 50 of the first extension 44 and subsequently through the fastening loop portions 50 of the second extension 46. Finally, said rigging member 110 is routed across an interior ceiling portion of the vehicle 100 and latched or tied to stabilize the system 10 in a conventional manner. It is envisioned that a second rigging member 110 may also be utilized as needed to obtain a secure attachment of the system 10 to the vehicle 100 based upon cargo 130 quantities and user preference.

Figure 2:
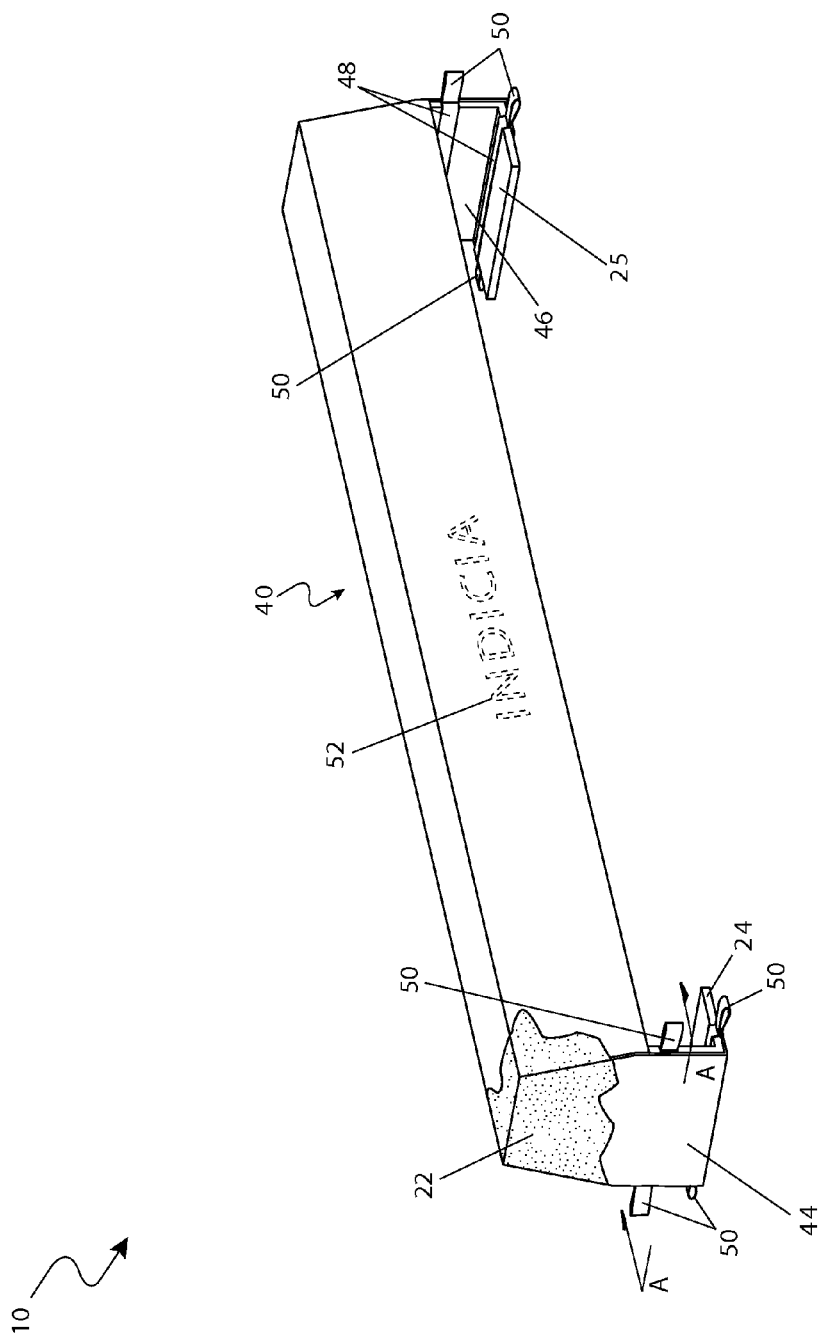
FIG. 2 is a perspective view of the protective rooftop rack system for motor vehicles 10 depicting an in-use state, according to the preferred embodiment of the present invention.
Figure 3:
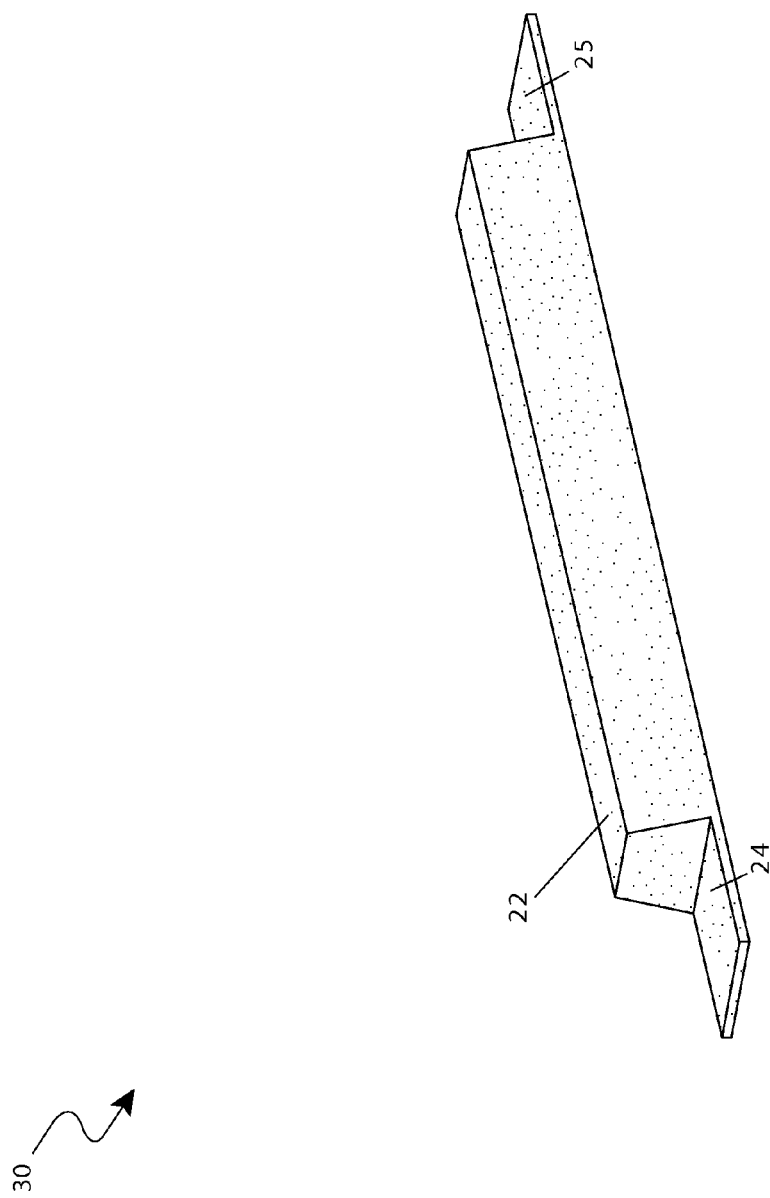
FIG. 3 is a cut-away perspective view of the foam assembly 20, according to the preferred embodiment of the present invention.
Figure 4:
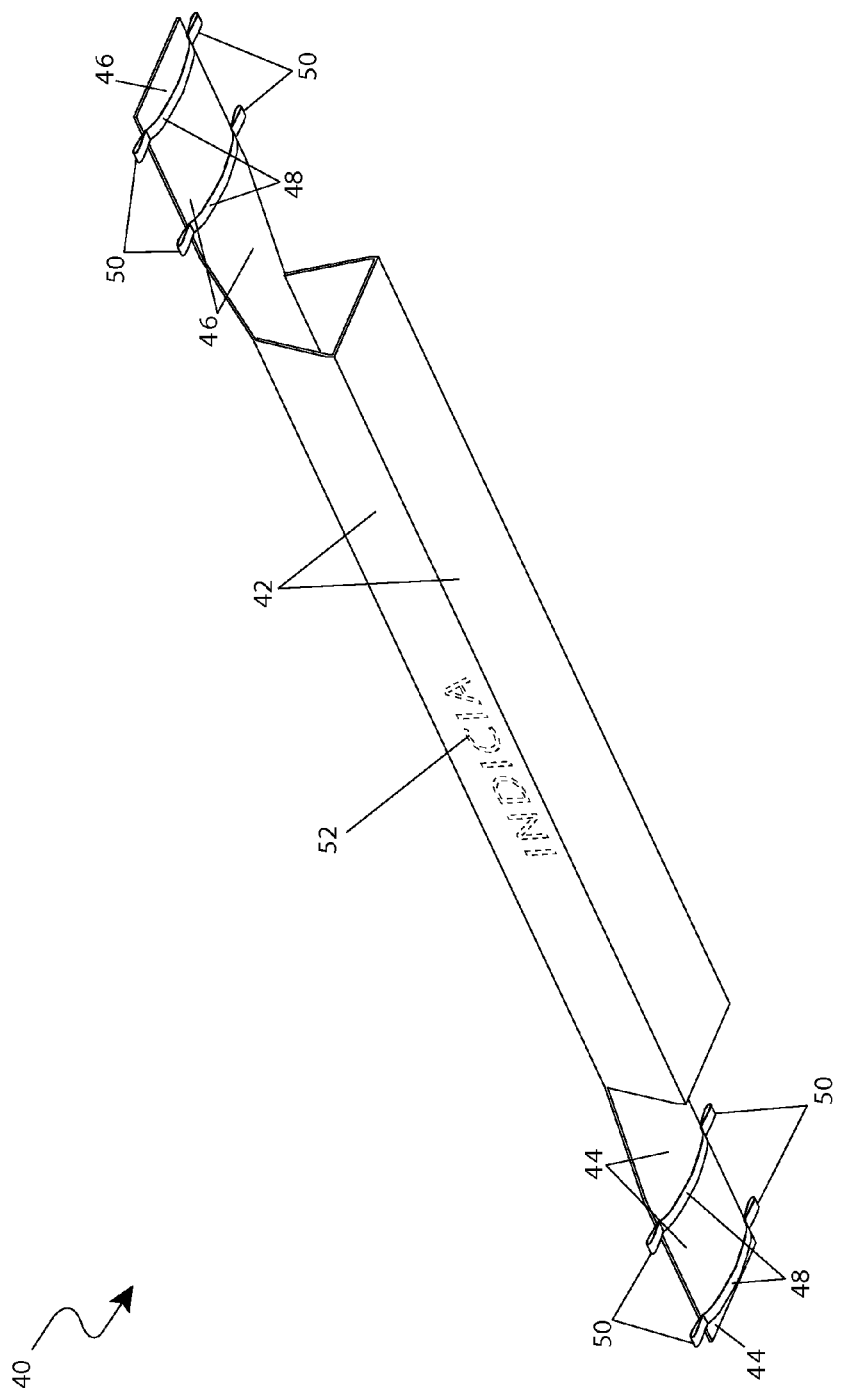
FIG. 4 is a bottom view of the fabric envelope assembly 40 portion of the protective rooftop rack system for motor vehicles 10 depicting an in-use state, according to the preferred embodiment of the present invention; and, FIG. 5 is a section view of extension portions 44, 46 of the protective rooftop rack system for motor vehicles 10 taken along section line A-A (see FIG. 2), according to the preferred embodiment of the present invention.

Referring now to FIGS. 2 through 4, perspective and cutaway views of the system 10, according to the preferred embodiment of the present invention, are disclosed. The foam assembly 20 comprises a linear block portion 22 approximately five (5) feet in length, six (6) inches in height, and six (6) inches wide at the base. Said block 22 preferably comprises a supportive and stabilizing trapezoidal cross section and a length which extends a width of the vehicle roof 100. The foam assembly 20 is envisioned to be flexible so as to allow said foam assembly 20 to bend around and conform to a curvature of the roof of the vehicle 100, while still providing a substantial base to stabilize the carried cargo 60.

Additionally, the block 22 comprises an integral first ear portion 24 upon a proximal end and an integral second ear portion 25 upon a distal end portion. Said ears 24, 25 extend outwardly from, and are coplanar with, a bottom surface of the block portion 22. Said ears 24, 25 are approximately five (5) inches in width, eight (8) inches in length, and one-half (½) inch in thickness and provide a protective padding to window openings 105 of the vehicle 100 during use of the system 10 as well as providing an attachment means to the fabric envelope assembly 40 described below. Although the foam assembly 20 is illustrated here in a preferred trapezoidal silhouette, it is understood that said foam assembly 20 may be introduced in various dimensions and silhouettes with equal benefit to a user. The block 22 is preferably made using a polyurethane foam material or equivalent comprising physical properties suitable to the anticipated compression, tension, and strength requirements relative to legal cargo 130 loading. The block 22 may be provided using alternate cushioning materials based upon anticipated cargo 130 loading and as such should not be interpreted as a limiting factor of the system 10. The block 22 provides a high shock absorption means permitting the cargo 130 to be transported without relative motion inward toward the vehicle roof 100 and is designed to encompass high load-bearing capacity with superior abrasion resistance, high toughness properties, and the capability of functioning in a wide temperature range. The properties of the block 22 permit a high modulus as well as high elongation for optimal loading capabilities.

The protective fabric envelope assembly 40 comprises a tube-shaped textile assembly having open end portions. Said fabric envelope assembly 40 is particularly sized to provide a snug-fitting enclosure means around the block 22 to prevent damage and scratches to the vehicle roof 100 and the cargo 130 being transported. The fabric envelope assembly 40 is envisioned to be made using a soft waterproof material such as nylon, rayon, polyester, or the like. The fabric envelope assembly 40 is envisioned to be removably attachable to said block 22 for easy cleaning, servicing, and replacement. The fabric envelope assembly 40 is envisioned to be introduced in a variety of decorative colors and patterns and may contain various indicia 52 such as logos, messages, script, or the like. The fabric envelope assembly 40 comprises integral first extension 44 and a second extension 46 portions which extend from opposing ends of said fabric envelope assembly 40, and are coplanar to a top surface of said fabric envelope assembly 40. The extensions 44, 46 comprise an integral fabric panel approximately five (5) inches in width and approximately eight (8) inches in length. Said extensions 44, 46 receive the aforementioned respective ear portions 24, 25 of the foam assembly 20 via a pair of sewn-in anchoring loops 48 which extend between and are sewn to side edges of said extensions 44, 46 so as to allow a respective ear portions 24, 25 to pass through and be contained within said anchoring loops 48 in a parallel manner, thereby providing attachment between said foam assembly 20 and the fabric envelope assembly 40 at respective end portions. During use said extensions 44, 46 are envisioned to be folded in a vertically downward direction over a top window opening portion 105 of the vehicle 100 while providing protective padding to said top window opening portion 105 of the vehicle 100 via the entrapped foam ear portions 24, 25 of the foam assembly 20.

Referring now to FIG. 5, a section view of extension portions 44, 46 of the system 10 taken along section line A-A (see FIG. 2), according to the preferred embodiment of the present invention, is disclosed. Each extension 44, 46 comprises two (2) anchoring loops 48 which extend across respective extensions 44, 46 being sewn to bottom side edge portions. Each anchoring loop 48 in turn comprises two (2) fastening loops 50 which protrude perpendicularly from opposing lateral sides of each extension 44, 46, thereby providing a means to secure the system 10 to the roof portion of the vehicle 100 using various rigging members 110 (see FIG. 1).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: procuring the system 10 having a desired length, color, and indicia 52; inserting the foam assembly 20 into the fabric envelope assembly 40, if not previously installed; inserting the ear portions 24, 25 of the foam assembly 20 through respective anchoring loop portions 48 of the extensions 44, 46, if not previously inserted; opening door or window portions 105 of the vehicle 100; positioning the system 10 upon a rooftop portion of the vehicle 100 at a desired location; positioning the extensions 44,46 so as to be suspended on each side downwardly over a window opening portion 105; securing the system 10 to the vehicle 100 by routing at least one (1) rigging member 110 through the fastening loop portions 50 of the first extension 44; routing said rigging member 110 through the fastening loop portions 50 of the second extension 46; routing said rigging member 110 across an interior ceiling portion of the vehicle 100; latching and tightening said rigging member 110 if utilizing a tie-down device or tying said rigging member 110 if utilizing rope, cord, or the like to secure the system 10; installing a second rigging member 110 as previously described by utilizing the remaining fastening loops 50, as needed; installing additional units of the system 10 along a roof portion of the vehicle 100 as described above, as needed based upon an anticipated cargo 130 to be loaded; placing a quantity of cargo 130 or other similar items to be transported upon the system 10; securing said cargo 130 by using additional rigging members 110 as required to stabilize said cargo 130; transporting said cargo 130 to a destination in a normal manner; removing the rigging members 110 and removing the cargo 130 from the system 10; removing the rigging members 110 fastening the system 10 to the vehicle 100; removing and storing the system 10 until again needed; and, benefiting from a protective, safe, and easily installed system 10 for transporting cargo 130 using one's vehicle 100.

The system 10 may also be utilized to jointly secure the cargo 130 and the system 10 simultaneously using the same rigging members 110 by performing the following additional steps: placing said cargo 130 to be transported upon the system 10 prior to securing said system 10 to the vehicle 100; routing at least one (1) rigging member 110 through the fastening loop portions 50 of the first extension 44; wrapping said rigging member 110 over and/or around the cargo 130; routing said rigging member 110 through the fastening loop portions 50 of the second extension 46; routing said rigging member 110 across an interior ceiling portion of the vehicle 100; and, latching and tightening said rigging member 110 as described above.

The system 10 may utilize an additional rigging member 110 by utilizing the remaining fastening loop portions 50 of the system 10.

Furthermore, additional systems 10 may be mounted to the vehicle 100 as previously described to achieve increased stability of loaded cargo 130, as desired.

During the installing of the system 10 the spacing between each system 10 is envisioned to vary in dimension based upon the vehicle type 100 and particular dimensions of the cargo 130. Prudent safety precautions are to be applied relative to cargo 130 size and weight as well as with regard to applicable state and local regulations.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A protective device adaptable for use on a roof of a vehicle, comprising:
   an elongated support structure including a grooved bottom surface and provided with axially opposed first and second ends and further comprising:
      a deformably resilient block formed from polyurethane foam;
      a first protruding portion outwardly extending from said first end of and coplanar with said bottom surface of said block; and
      a second protruding portion outwardly extending from said second end of and coplanar with said bottom surface of said block; and
   a protective cover removably positioned over said support structure, comprising:
      a protective fabric envelope being formed from water-impermeable material, comprising opposing first and second open end portions and extending along a major surface area of said support structure;
      a first extension portion outwardly extending from and coplanar with an upper surface of said first open end portion and at least partially covering said first protruding portion of said support structure;
      a second extension portion outwardly extending from and coplanar with an upper surface of said second open end portion and at least partially covering said second protruding portion of said support structure;
   wherein said support structure is adapted to be directly positioned on said roof vehicle roof and traversing thereacross;
   wherein said first protruding portion and said second protruding portion are substantially thinner than said block;
   wherein said first protruding portion and said second protruding portion are independently foldable relative to said block;
   wherein each said first extension portion and said second extension portion comprises at least one anchoring loop affixed to opposing perimeter edges and spanning along an inner surface thereof, thereby retaining said first protruding portion and said second protruding portion, respectively;
   wherein said protective device supports cargo for transport on said roof of said vehicle; and
   wherein said protective device protects said roof of said vehicle from damage during support and transport of said cargo.

2. The protective device of claim 1, wherein said support structure has a longitudinal length arranged perpendicular to a longitudinal length of said vehicle.

3. The protective device of claim 1, wherein said block further comprises a generally trapezoidal shape.

4. The protective device of claim 1, wherein said grooved bottom surface is bendable and adapted to maintain direct contact with the vehicle roof by conforming to a contour thereof.

5. The protective device of claim 1, wherein each said at least one anchoring loop comprises a pair of fastening loops affixed to and perpendicularly protruding from opposing lateral sides;
   wherein each of said pair of fastening loops receives a rigging means therethrough for securing said protective device to said vehicle.

6. The protective device of claim 1, further comprising indicia disposed along an outer surface of said protective fabric envelope.

7. A protective device adaptable for use on a roof of a vehicle, comprising:
   an elongated support structure including a grooved bottom surface and provided with axially opposed first and second ends and further comprising:
      a deformably resilient block formed from polyurethane foam;
      a first protruding portion outwardly extending from said first end of and coplanar with said bottom surface of said block; and
      a second protruding portion outwardly extending from said second end of and coplanar with said bottom surface of said block;
   a protective cover removably positioned over said support structure, comprising:
      a protective fabric envelope being formed from water-impermeable material, comprising opposing first and second open end portions and extending along a major surface area of said support structure;
      a first extension portion outwardly extending from and coplanar with an upper surface of said first open end portion and at least partially covering said first protruding portion of said support structure;
      a second extension portion outwardly extending from and coplanar with an upper surface of said second open end portion and at least partially covering said second protruding portion of said support structure; and
   at least one rigging member removably positioned and secured within said protective cover;
   wherein said support structure is adapted to be directly positioned on said roof vehicle roof and traversing thereacross;
   wherein said first protruding portion and said second protruding portion are substantially thinner than said block;
   wherein said first protruding portion and said second protruding portion are independently foldable relative to said block;
   wherein each said first extension portion and said second extension portion comprises at least one anchoring loop affixed to opposing perimeter edges and spanning along an inner surface thereof, thereby retaining said first protruding portion and said second protruding portion, respectively;
   wherein said protective device supports cargo for transport on said roof of said vehicle;
   wherein said protective device protects said roof of said vehicle from damage during support and transport of said cargo; and
   wherein said at least one rigging member secures said protective device to said vehicle.

8. The protective device of claim 7, wherein each said at least one anchoring loop comprises a pair of fastening loops affixed to and perpendicularly protruding from opposing lateral sides;
   wherein each of said pair of fastening loops receive said at least one rigging member routed therethrough.

9. The protective device of claim 8, wherein said at least one rigging member further comprises of the following list: a ratcheting tie-down strap, a cord, a rope, or a bungee cord.

10. The protective device of claim 7, wherein said support structure has a longitudinal length arranged perpendicular to a longitudinal length of said vehicle.

11. The protective device of claim 7, wherein said block further comprises a generally trapezoidal shape.

12. The protective device of claim 7, wherein said grooved bottom surface is bendable and adapted to maintain direct contact with the vehicle roof by conforming to a contour thereof.

13. The protective device of claim 7, further comprising indicia disposed along an outer surface of said protective fabric envelope.

* * * * *